United States Patent Office 2,876,255
Patented Mar. 3, 1959

2,876,255

PREPARATION OF BROMO ACIDS AND ESTERS

James D. Johnston, Baton Rouge, La., assignor to Ethyl Corporation, New York, N. Y., a corporation of Delaware No Drawing. Application April 26, 1956
Serial No. 580,727

7 Claims. (Cl. 260—487)

This invention relates to the production of bromo carboxylic acids and esters particularly alpha monobromo carboxylic acids and their lower alkyl esters.

Alpha monobromo acids and esters are polyfunctional compounds eminently suited as chemical intermediates for the manufacture of monomers, plasticizers, dibasic acids, thioglycolic acid, drugs and other organic compounds having great commercial value. The commercial use of these intermediates to date has been limited by their relatively high cost which is generally due to the complex and difficult processes heretofore employed in their manufacture. One suggested route involves the catalytic bromination of the corresponding acid or ester, an operation necessitating the use of liquid bromine. Liquid bromine is not only expensive but is also an unpleasant material to handle or store due to its highly corrosive properties. Moreover, bromination processes of this type lack of selectivity of introducing the bromo substituent on the desired carbon atom of a long aliphatic chain i. e. alpha to the carboxylic groups, and are particularly unsuited for the preparation of the alpha mono bromo derivatives of acids or esters having more than 2 carbon atoms. The general occurrence of overbromination, i. e. formation of polybromo acids or esters, is another contributing factor to the inadequacy of these prior processes. Difficulty in separation of monobromo-acids or esters from over brominated products to give very pure monobromo compounds, likewise, militates against such processes. The nonselectivity in both position and number of bromine atoms results in the wasteful conversion of a large part of the valuable reactants to undesired materials whose formation adds considerably to the ultimate cost of the desired product.

It is accordingly an object of the present invention to provide an improved process for producing bromocarboxylic acids and esters. Another object is to provide a process for the selective production of alpha-monobromocarboxylic acids and esters. A still further object is to provide a process of the above type which does not employ elemental bromine. Further objects and advantages of this invention will become apparent from the following discussion.

I have now found that alpha-hydroxy carboxylic compounds can be economically and efficiently converted to the corresponding alpha-monobromo acids or esters by a process which does not employ elemental bromine. The present process comprises reacting an alpha-hydroxy carboxylic acid having from 2 to 14 carbon atoms, or an ester of this acid, with hydrogen bromide under reaction conditions wherein the water produced by the reaction is continuously removed from the reaction system. The reaction is carried out at a temperature above the boiling point of water or an azeotrope thereof and generally below the boiling point of a constant boiling mixture of water and hydrogen bromide at the reaction pressure employed. In contrast to the prior art processes, the present process effects the formation of the desired alpha-bromo acid or ester in excellent yield while removing water without any substantial carryover of hydrogen bromide and concurrently maintaining a liquid phase in the reaction zone. The alpha-hydroxy compounds employed in the present invention are of the type RCHOHCOOR' where R and R' are carboxylic substituents selected from the group consisting of hydrogen, aliphatic radicals and aromatic radicals.

In order to effect the foregoing reaction several generalized routes are possible. In all these routes, it is seen that a relationship is maintained between the variables of temperature and pressure so as to avoid any attendant buildup of water in the reaction system due to its formation during the reaction. In all embodiments of the invention the removal of water is effected without the loss of any appreciable amount of hydrogen bromide or the alpha-hydroxy acid or ester. One general procedure involves the reaction of a molten alpha-hydroxy carboxylic acid or ester with an anhydrous stream of hydrogen bromide under reaction conditions whereby water is volatilized as it is formed. A more preferred procedure involves the reaction of a molten alpha-hydroxy acid or ester with anhydrous hydrogen bromide generated in situ from a metal bromide, preferably an alkali or alkaline earth metal bromide, and a sufficiently strong acid to liberate hydrogen bromide therefrom. Here again, water is vaporized out of the reaction system as it is formed. The procedure most commonly preferred involves the reaction of the alpha-hydroxy acid or ester with an aqueous hydrogen bromide solution under reaction conditions wherein the additional water formed by the reaction is volatilized from the reaction zone. Another preferred procedure employs the technique of adding an inert diluent or solvent to the reaction zone and removing the water formed therein as an azeotrope mixture with the diluent. Another route contemplates the concomitant bromination and esterification of an alpha-hydroxy acid by its reaction with hydrogen bromide in the presence of the desired esterifying alcohol. As will be apparent from the more detailed description given hereafter, it will be seen that all of the embodiments of the invention fall within the above mentioned variance of modes of carrying out the process.

The particular details of carrying out any one embodiment of the present invention can vary appreciably from others depending generally upon whether hydrogen bromide is formed in situ or preformed prior to its contact with the alpha-hydroxy acid or ester.

Other process variables such as the presence or absence of a solvent or the possible employment of different routes for removal of water from the reaction zone also affect the particular details in conducting the present process. In one generally applicable procedure the process can conveniently be carried out either in a batch or continuous operation with the aid of a fractionating column or an equivalent device. The alpha-hydroxy compound and the hydrogen bromide are fed into a reaction zone at the lower end of the fractionating column and reacted therein at a temperature above the boiling point of water at the pressure employed. In a preferred form of the invention, the temperature of the reaction mixture is maintained below the boiling point of a constant-boiling mixture of hydrogen bromide at the reaction pressure employed. Generally, the reaction temperature is also below the boiling point but above the melting point of either the alpha-hydroxy material or the desired products thereby maintaining a liquid phase within the reaction zone. The requisite temperature can be maintained in the reaction zone either by supplying the necessary heat to the reactants prior to admission to the reaction zone or by some external or internal heating device.

If desired, a mixture of hydrogen bromide and the alpha-hydroxy acid or ester can be introduced into the fractionating column at a point removed from either end thereof, this zone being maintained at a temperature above the boiling point of water. The temperature of the upper part of the column is adjusted so as to permit the escape of water vapor while retaining the organic compound as well as a constant boiling mixture of hydrogen bromide and water, i. e. 47.6 percent hydrogen bromide, and permitting substantially no carryover of hydrogen bromide.

The lowest portion of the column is also advantageously maintained as a temperature above the boiling point of water but below that of a constant boiling mixture of hydrogen bromide and water or that of the alpha-hydroxy compound or reaction products. The alpha-bromoacid or ester produced by this route can then be removed at the lower end of the column and any reacted alpha-hydroxy compound can be recycled to the feed zone of the column.

The rate of feed to such a reaction system should preferably be such that the reactor can adequately remove the reaction water at a rate dictated by its rate of formation.

The following examples illustrate the invention as applied to production of alpha-bromo carboxylic acids or esters under the present process. All parts given are by weight.

Example I

The apparatus employed in the present example consisted of a fractionating column mounted on a pressure reaction vessel. The reaction vessel was charged with 2170 parts of a 70 percent glycolic acid solution and 3539 parts of an aqueous 47.6 percent hydrogen bromide solution. The reaction mixture was raised to a temperature between 115 and 120° C. and maintained there while continuously taking water overhead through the fractionating column. After collecting 2546 parts of water containing less than 1 percent hydrogen bromide the reaction mixture was subjected to a fractionation under reduced pressure to give 2107 parts of bromoacetic acid. The fractionation residue was then treated with 666 parts of a 47.6 percent hydrogen bromide solution and the mixture subjected to a fractionation which yielded an additional 412 parts of bromoacetic acid to make a total yield of 2519 parts of bromoacetic acid. This represented a better than 90 percent yield of bromoacetic acid based on the glycolic acid employed.

The use of an azeotrope system for removal of water from the reaction zone has been noted above and is demonstrated in the following example.

Example II

In a reaction vessel connected to a glass lined fractionating column fitted with a water separator and a return line to the reaction zone were placed 152 parts of glycolic acid, 400 parts of toluene and 683 parts of an aqueous 47.5 percent hydrobromic acid solution. The solution turned wine-red on addition of the hydrobromic acid to the glycolic acid and the temperature dropped from 28° C. to 2° C. On heating the dark red color disappeared and the solution became pale orange. The reaction mixture was heated to a temperature between about 100° and 110° C. whereupon the separation of a water-toluene azeotrope by distillation was initiated. The distillate was collected and settled into two phases with the toluene phase constantly being recycled to the reaction zone. The operation was continued until a total of 494 parts of an aqueous distillate was obtained. The reaction mixture was then subjected to a fractionation under reduced pressure so as to remove all the toluene, water and unreacted hydrogen bromide. Further fractionation of the residue gave 176.4 parts of bromoacetic acid which represented a 63.5 percent yield based on the glycolic acid employed.

When xylene, benzene, diphenyl ether, di-iso-butyl ether, ethyl butyrate, mesityl oxide and methyl iso-butyl ketones are employed as diluents in place of toluene, similar azeotropes are formed and equally as good yields of bromoacetic acid results.

Example III

In a reaction flask equipped with a thermometer, fritted glass bubbler, a gas outlet and a fractionating column were placed 76 parts of glycolic acid. The glycolic acid was heated to 90° and anhydrous hydrogen bromide gas was introduced into the reaction zone and bubbled through the molten glycolic acid. The hydrogen bromide was readily taken up with an evolution of heat and a reaction temperature of 110° to 115° C. was maintained by the controlled addition of the hydrogen bromide. The addition of hydrogen bromide was accompanied by the formation of water which was taken overhead through the fractionating column at a controlled rate roughly corresponding to the rate of water formation. The addition of hydrogen bromide was terminated when it no longer was being absorbed in the reaction zone and began to appear in the overhead aqueous distillate. The reaction mixture was then subjected to a fractionation under reduced pressure to give an excellent yield of bromoacetic acid.

As heretofore noted, the present process also contemplates the use of hydrogen bromide formed in situ from a metal bromide and an acid. The following example demonstrates the efficacy of such a route.

Example IV

In the apparatus of Example I were placed 38 parts of glycolic acid, 60 parts of potassium bromide and 100 parts of benzene. The mixture was cooled and 25 parts of concentrated sulfuric acid were slowly added. The addition of acid was followed by the application of heat to the reaction mixture to maintain a reaction temperature between 115 to 120° C. The mixture was refluxed for four hours during which time water was collected outside of the reaction zone. The product was filtered while hot and the solids extracted with an additional 100 parts of hot benzene, the benzene extract being combined with the filtrate. A very good yield of bromoacetic acid was obtained.

The operation of a continuous reactor for the preparation of the alpha-bromo acids by the present process is demonstrated by the following example.

Example V

The reactor consisted of a reaction flask fitted with a bottoms outlet, a thermometer, a solvent return line and a glass lined fractionating column. The column consisted of a fractionation section, a feed section and a reflux head. A condenser and one separator were used to remove water and return the hydrocarbon solvent to the reaction zone. The column was operated by feeding a mixture consisting of an aqueous 47 percent hydrobromic acid solution and an aqueous 70 percent glycolic acid solution into the top feed section. One hundred parts of an inert hydrocarbon diluent were added to the reaction vessel so as to provide for an azeotropic distillation of water through the fractionating column. The results of three runs are given in the following table.

| Feed Composition | | Feed Rate, Parts/hr. | Water Overhead, Parts/hr. | Reactor Temp., °C. | Diluent |
| --- | --- | --- | --- | --- | --- |
| Parts glycolic acid/hr. | Parts hydrobromic acid/hr. | | | | |
| 0.20 | 0.43 | 30 | 10 | 110 | Toluene. |
| 0.32 | 0.34 | 30 | 25 | 115 | Toluene. |
| 0.32 | 0.34 | 30 | 20 | 120 | Xylene. |

Each of the runs was continued for a period of 14 hours at the end of which time the reaction mixture was removed from the reaction zone, the hydrocarbon diluent decanted from the aqueous phase which was then extracted with additional hydrocarbon diluent and the combined solvent extracts fractionally distilled under reduced pressure to recover the alpha-bromoacetic acid in a better than 71 percent yield. Similar results are obtained when the feed mixture is introduced into the center region of the fractionating column.

*Example VI*

The procedure of Example I is repeated with the exception that an aqueous solution of lactic acid is employed in place of the glycolic acid. A good yield of alpha-bromopropionic acid is obtained. When the alpha-hydroxy derivatives of such acids as butyric acid, caproic acid, caprylic acid, and capric acid are employed in place of the lactic acid, similar results are obtained.

The process of the present invention can also employ the alpha-hydroxy derivatives of carboxy esters as reactants in place of the corresponding hydroxy acids.

*Example VII*

When methyl glycolate, ethyl lactate, ethyl alpha-hydroxybutyrate, propyl alpha-hydroxyhexanoate, and cetyl alpha-hydroxydecanoate are employed in the procedure of Example I, very good yields of the corresponding alpha bromoester are obtained.

*Example VIII*

The procedure of Example I is again repeated with the exception that a reaction temperature of 200° C. and a reaction pressure of 15 atmospheres are employed. Satisfactory yields of alpha-bromoacetic acid are obtained.

*Example IX*

The apparatus of Example I is again employed in this example. The reaction vessel is charged with 2100 parts of an aqueous 70 percent glycolic acid solution, 3550 parts of an aqueous 47.6 percent hydrogen bromide solution and 1500 parts of methyl alcohol. The reaction temperature is slowly increased to between 100 and 105° C. at which time an azeotrope of methyl bromoacetate and water boiling at a temperature of 92° C. is collected through the fractionation column. The reaction is continued until the azeotrope ceases coming overhead at which point the reaction temperature is lowered to room temperature and the residue in the reaction flask is discharged and fractionated to recover additional methyl bromoacetate. The azeotrope layers are separated and the lower methyl bromoacetate layer is collected to give methyl bromoacetate of very high purity. A very good yield of methyl bromoacetate is obtained.

*Example X*

If desired, the alpha-bromoacid may be prepared by the present process and thereafter converted to the desired ester. The following procedure has been found to yield excellent results for the conversion of the acid to the desired ester. The apparatus consisted of a reaction vessel equipped with a thermometer, means for introducing feed material thereto and external heating means. The reaction vessel was connected to a glass lined fractionating column equipped with a total take-off. The reaction vessel was charged with 1560 parts of bromoacetic acid and 750 parts of methyl alcohol and the reaction zone temperature was then slowly increased. An initial distillation cut over the range of 65° to 85° C. consisted essentially of wet methanol. A second cut over the range of 85° to 135° C. consisted essentially of an azeotrope of methyl bromoacetate and water. The receiver was then changed and the reaction temperature was increased to 160° C. at which point pure methyl bromoacetate was collected through the fractionating column. The reaction temperature was then lowered to room temperature and the residue in the reaction flask consisting essentially of unreacted bromoacetic acid and a small quantity of methyl bromoacetate was removed and recycled as a partial feed for another esterification process run. An excellent yield of methyl bromoacetate was collected, including that obtained as an azeotrope. Similar results are obtained in the esterification of alpha-bromopropionic acid, alpha-bromo caproic acid, etc.

The alpha-hydroxy carboxylic acids and esters employed in the present invention are of the type RCHOHCOOR' where R and R' may be the same or different and each can be either hydrogen or a monovalent organic radical such as for example, aryl, alkyl, alkaryl, aralkyl, olefinyl, alicyclic, or any mixture of these groups. For instance, the radicals may be methyl, ethyl, butyl, amyl, tertiary butyl, isoamyl, hexyl, cyclohexyl, vinyl, benzyl, phenyl, tolyl, xylyl, phenethyl, ethyl phenyl, naphthyl, and the like. The aliphatic groups can be cyclic, straight chain or branched chain and any of the radicals can be substituted with any group which is not reactive with hydrogen bromide under the reaction conditions employed. When aliphatic radicals are employed it is generally preferred to use alkyl or hydrocarbon substituted alkyl radicals having up to about 12 carbon atoms. Aromatic radicals having up to about 12 carbon atoms are usually preferred when it is desired to employ an aromatic substituent in the alpha-hydroxy acid or ester.

It is necessary to carry out the reaction in a liquid phase in order to secure intimate contact between the alpha-hydroxy compound and the hydrogen bromide as well as to effect the continuous removal of the water formed in the reaction from the reaction zone without any carry-over of the reactants. It is therefore desirable to maintain a temperature and pressure relationship which will maintain a liquid phase in the reaction zone at all times. Reaction temperatures above the boiling point of water or an azeotrope thereof, and below the boiling point of the reactants employed as well as a constant boiling mixture of water and hydrogen bromide are generally employed with temperatures between 50° and 200° and more particularly between 105° and 120° being generally useful. Temperatures above 200° C. can be used if desired although the use of such high temperatures is liable to lead to the destruction of part of the alpha-hydroxy compound or the alpha-bromo compounds.

Atmospheric to superatmospheric pressures i. e. up to about 15 atmospheres can be used. Pressures above atmospheric are generally employed when necessary to confine the reactants to a liquid phase where temperatures above their atmospheric boiling point are employed. Generally, however, it is preferred to operate at atmospheric pressure or slightly above atmospheric pressure primarily as a matter of convenience and ease in operation.

As heretofore indicated a solvent may or may not be employed in the various embodiments of the present invention. When a solvent is employed it may be water, a ketone, an ether, an ester, or a hydrocarbon such as an aromatic, aliphatic, or alicyclic hydrocarbon. Hydrocarbon solvents are preferred since they are operable over a wide range of temperature conditions without effecting any side reactions with the reactants involved. Certain of the aforementioned solvents have the particular advantage of forming azeotropic systems with water thereby contributing to the ease of reaction and rapidity of arriving at completion of the reaction at relatively lower temperatures and pressures.

When water is employed as a solvent, it is generally employed only in a quantity sufficient to provide a constant boiling mixture with the hydrogen bromide initially present in the reaction zone.

Generally, as the water content of the reaction mixture increases the reaction rate decreases. It is therefore desirable to remove enough water to insure the maintenance of the reaction rate but not enough to cause the constant boiling mixture of water and hydrogen bromide, i. e., 47.5 percent by weight of hydrogen bromide, to be removed from the reaction zone. As heretofore noted, the hydrogen bromide used may be in the gaseous phase or in an aqueous solution with the latter procedure being more convenient. Increasing the hydrogen bromide concentration in the aqueous phase of the reaction mixture increases the rate of reaction so that a highly concentrated aqueous solution of hydrogen bromide is desired. It has been found that aqueous reaction solutions containing from about 40 to about 47.6 percent by weight of hydrogen bromide are satisfactory with respect to the hydrogen bromide concentration in the reaction zone.

The proportion of hydrogen bromide to alpha-hydroxy compound employed in the reaction zone may be varied somewhat but it is generally desirable to use the reactants in at least stoichiometric proportions, with an excess of hydrogen bromide being particularly preferred. Generally, a mole ratio of hydrogen bromide to the alpha-hydroxy compound of between about 1:1 to 2:1 and preferably 1.1:1 to 1.5:1 is employed. Under certain reaction conditions, however, such that complete conversion is not secured, it may be desirable to use an excess quantity of the alpha-hydroxy compound to avoid recovery of the unreacted hydrogen bromide.

In general, when conducting this process in the presence of a liquid solvent or carrier, the amount of solvent should be proportioned so as to provide adequate heat removal facilities. In general, the load on the heat transfer medium is proportional to the concentration or relative proportion of the reactant or carrier. Generally, the use of from about 0.5 to 2000 parts or more preferably 10 to 1000 parts of solvent per part of alpha-hydroxy compound being reacted is recommended as a suitable reaction dilution in those embodiments of this invention where the use of a solvent is desired.

While it is believed that in general, a catalyst is not required for the practice of this invention, certain materials do exhibit a catalytic effect upon the reaction. Heavy metal chlorides such as for example, zinc chloride, antimony trichloride, stannic chloride, mixtures of stannous and stannic chlorides, ferric chloride, and many oxy acids such as sulfuric acid, sulfonic acids, phosphoric acid, and the like have been found to be desirable as catalysts. Generally, these additives when employed are present in concentrations of not greater than about 15 percent by weight of the alpha-hydroxy compound present and preferably less than about 5 percent. Concentrations of these additive materials in the range of 0.0001 to 15.0 percent and preferably between 0.01 to 5.0 percent by weight of the alpha-hydroxy compound employed have been found to be suitable for accomplishing the desired results.

It will be understood that the details and examples hereinbefore set forth are illustrative only in that the invention is broadly described and claimed and is in no way limited thereby.

What I claim is:

1. A process for the production of alpha-bromoorgano compound comprising reacting an alpha-hydroxy carboxylic compound of an alpha-hydroxy carboxylic acid having from 2 to 14 carbon atoms with hydrogen bromide under reaction conditions whereby water is removed from the reaction zone during said reaction without substantial carryover of said hydrogen bromide.

2. A process for the production of alpha-bromocarboxylic acids comprising reacting an alpha-hydroxy carboxylic acid having from 2 to 14 carbon atoms with hydrogen bromide at a reaction temperature above the boiling point of water at the reaction pressure employed and removing water from the reaction zone during said reaction without substantial carry over of said hydrogen bromide.

3. The process of claim 2 wherein the alpha-hydroxy acid is glycolic acid.

4. The process of claim 3 wherein glycolic acid is reacted with an aqueous solution containing between about 40 and 47.6 percent hydrogen bromide by weight.

5. A process for the production of alpha-bromocarboxylic esters comprising reacting an alpha-hydroxy carboxylic ester of an alpha-hydroxy carboxylic acid having from 2 to 14 carbon atoms with hydrogen bromide at a temperature above the boiling point of water at the reaction pressure employed and removing water from the reaction zone during said reaction without substantial carry over of said hydrogen bromide.

6. The process of claim 5 wherein the alpha-hydroxy carboxylic ester is methyl glycolate.

7. A process for the production of alpha-bromo compounds comprising reacting an alpha-hydroxy carboxylic compound of an alpha-hydroxy carboxylic acid having from 2 to 14 carbon atoms with a metal bromide and an acid capable of reacting with said metal bromide to form hydrogen bromide under reaction conditions whereby water is removed from the reaction zone without substantial carry over of said hydrogen bromide.

References Cited in the file of this patent

Kekule: Ann. Chim. (Liebig), v. 130 (1864), pp. 16–21.
Henry: Ann. Chim. (Liebig), v. 156 (1870), p. 176.
Fling et al.: J. Am. Chem. Soc., 69 (1947), p. 2466.

UNITED STATES PATENT OFFICE
CERTIFICATE OF CORRECTION

Patent No. 2,876,255                                                                       March 3, 1959

James D. Johnston

It is hereby certified that error appears in the printed specification of the above numbered patent requiring correction and that the said Letters Patent should read as corrected below.

Column 3, line 18, for "reacted" read -- unreacted --.

Signed and sealed this 1st day of December 1959.

(SEAL)
Attest:

KARL H. AXLINE                                                   ROBERT C. WATSON
Attesting Officer                                              Commissioner of Patents